(12) United States Patent
Morrison et al.

(10) Patent No.: US 6,947,032 B2
(45) Date of Patent: Sep. 20, 2005

(54) TOUCH SYSTEM AND METHOD FOR DETERMINING POINTER CONTACTS ON A TOUCH SURFACE

(75) Inventors: Gerald D. Morrison, Calgary (CA); Randy McCharles, Calgary (CA); Scott Yu Tseng Su, Calgary (CA); Manvinder Singh, Calgary (CA)

(73) Assignee: Smart Technologies Inc. (CA)

(*) Notice: Subject to any disclaimer, the term of this patent is extended or adjusted under 35 U.S.C. 154(b) by 328 days.

(21) Appl. No.: 10/384,796

(22) Filed: Mar. 11, 2003

(65) Prior Publication Data

US 2004/0178993 A1 Sep. 16, 2004

(51) Int. Cl.[7] .................................................. G09G 5/00
(52) U.S. Cl. ........................ 345/173; 345/175; 345/179; 345/180; 345/181; 345/182; 345/183
(58) Field of Search ................................ 345/173, 175, 345/179–183

(56) References Cited

U.S. PATENT DOCUMENTS

| | | | |
|---|---|---|---|
| 4,507,557 A | 3/1985 | Tsikos | 250/341 |
| 4,742,221 A | 5/1988 | Sasaki et al. | 250/221 |
| 4,746,770 A | 5/1988 | McAvinney | 178/18 |
| 4,818,826 A | 4/1989 | Kimura | 178/19 |
| 5,317,140 A | 5/1994 | Dunthorn | 250/221 |
| 5,502,568 A | 3/1996 | Ogawa et al. | 356/375 |
| 5,936,615 A | 8/1999 | Waters | 345/173 |
| 6,008,798 A | 12/1999 | Mato, Jr. et al. | 345/168 |
| 6,061,177 A * | 5/2000 | Fujimoto | 359/443 |
| 6,100,538 A | 8/2000 | Ogawa | 250/559.38 |
| 6,208,330 B1 | 3/2001 | Hasegawa et al. | 345/173 |
| 6,335,724 B1 | 1/2002 | Takekawa et al. | 345/173 |
| 6,414,671 B1 | 7/2002 | Gillespie et al. | 345/157 |
| 6,421,042 B1 | 7/2002 | Omura et al. | 345/157 |
| 6,531,999 B1 | 3/2003 | Trajkovic | 345/157 |
| 6,563,491 B1 | 5/2003 | Omura | 345/173 |
| 6,608,619 B2 * | 8/2003 | Omura et al. | 345/175 |
| 6,674,424 B1 * | 1/2004 | Fujioka | 345/157 |
| 2001/0019325 A1 | 9/2001 | Takekawa | 345/157 |
| 2001/0022579 A1 | 9/2001 | Hirabayashi | 345/175 |
| 2001/0026268 A1 | 10/2001 | Ito | 345/175 |

FOREIGN PATENT DOCUMENTS

| | | | |
|---|---|---|---|
| DE | 198 10 452 A1 | 12/1998 | G06F/3/033 |
| JP | 57-211637 | 12/1982 | G06F/3/03 |
| JP | 8-240407 | 9/1996 | G01B/11/00 |
| JP | 9-91094 | 4/1997 | G06F/3/03 |
| JP | 9-319501 | 12/1997 | G06F/3/03 |
| WO | WO 99/40562 | 8/1999 | G09G/5/00 |

OTHER PUBLICATIONS

"CCDs in optical touch panels deliver high resolution", Bud K. Funk, Electronic Design, Sep. 27, 1980, pp. 139–143.

* cited by examiner

Primary Examiner—Richard Hjerpe
Assistant Examiner—Alexander S. Beck
(74) Attorney, Agent, or Firm—Katten Munchin Rosenman LLP

(57) ABSTRACT

A system and method for determining pointer contacts on a touch surface includes a touch surface to be contacted by a pointer. At least one imaging device having a field of view looks generally along the touch surface. At least one processor communicates with the at least one imaging device and analyzes images acquired by the at least one imaging device to detect the relative positions of a pointer and a reflection of the pointer therein and thereby determine if a pointer contact with the touch surface has been made.

25 Claims, 4 Drawing Sheets

TOUCH SYSTEM AND METHOD FOR DETERMINING POINTER CONTACTS ON A TOUCH SURFACE

FIELD OF THE INVENTION

The present invention relates generally to touch systems and in particular to a touch system and method for determining pointer contacts on a touch surface.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users.

U.S. Pat. No. 5,448,263 to Martin, assigned to SMART Technologies, Inc., assignee of the present invention, discloses a passive touch system including an analog resistive touch screen coupled to a computer. Image data generated by the computer is conveyed to a projector, which in turn projects a corresponding image on the touch surface of the touch screen. When a user contacts the touch surface of the touch screen, the touch screen generates pointer position data that is conveyed to the computer. Depending on the mode of operation of the touch system, the computer either records the pointer position data as writing or uses the pointer position data to control execution of an application program executed by the computer. The computer also updates the image data so that the image presented on the touch surface by the projector reflects the pointer activity.

Since pointer position data is generated by the touch screen when a user presses on the touch surface hard enough to bring the layers of the touch screen together, pointer contacts with the touch surface that result in pointer position data being generated can always be determined. Pointer contacts with the touch surface that do not result in pointer position data being generated cannot be determined.

International PCT Application No. PCT/CA01/00980 filed on Jul. 5, 2001 and published under number WO 02/03316 on Jan. 10, 2002, assigned to SMART Technologies, Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look along the touch surface. The digital cameras acquire images from different locations and generate image data. The image data acquired by the cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or used to control execution of an application program executed by the computer.

In order to determine when a pointer contacts the touch surface the pixel rows of the digital cameras that correspond to the touch surface are determined. When a pointer exists in captured images a check is made to determine if the pointer extends into the pixel rows corresponding to the touch surface location. If so, a pointer contact with the touch surface is deemed to have been made. If desired, the three-dimensional profile of the touch surface can be mapped to improve accuracy in the determination of pointer contacts.

Although the above touch systems allow pointer contacts with the touch surface to be determined, alternative methods to determine pointer contacts on a touch surface are desired. It is therefore an object of the present invention to provide a novel touch system and method for determining pointer contacts on a touch surface.

SUMMARY OF THE INVENTION

According to one aspect of the present invention there is provided a method of determining pointer contact with a touch surface comprising the steps of:

capturing an image using an imaging device having a field of view oriented obliquely with respect to said touch surface; and processing the captured image to detect a pointer and a reflection of the pointer therein and determine if the detected pointer and reflection meet signifying pointer contact with said touch surface.

In a preferred embodiment, during the processing pixels in the images are examined to determine if empty or non-target pixels separate the target pixels representing the detected pointer and its reflection signifying non-pointer contact with the touch surface. When the at least one imaging device is oriented so that its field of view looks generally across the touch surface, the images are examined to determine if empty horizontal pixel rows separate the detected pointer and its reflection. If backlighting is provided the pointer and its reflection are separated by illuminated pixels when a pointer contact condition exists.

According to another aspect of the present invention there is provided a method of determining pointer contact with a touch surface comprising the steps of:

capturing images looking across said touch surface using a plurality of imaging devices positioned at different locations relative to said touch surface that have overlapping fields of view; and processing the captured images to detect a pointer and a reflection of the pointer therein and to determine the relative positions of said detected pointer and reflection and thereby determine pointer contact with said touch surface and pointer hover.

According to yet another aspect of the present invention there is provided a touch system comprising:

a touch surface to be contacted by a pointer;

at least one imaging device having a field of view looking generally across said touch surface; and at least one processor communicating with said at least one imaging device and analyzing images acquired by said at least one imaging device to detect the relative positions of a pointer and a reflection of the pointer therein and thereby determine if a pointer contact with the touch surface has been made.

According to still yet another aspect of the present invention there is provided a camera-based touch system comprising:

at least one pair of cameras positioned at spaced locations and having overlapping fields of view encompassing a touch surface on which pointer contacts are made, said cameras looking obliquely across said touch surface and acquiring images; and a processor receiving and processing image data generated by the cameras to determine the location of a pointer relative to the area when the pointer is captured in images acquired by the cameras and analyzing the image data to detect the relative positions of the pointer and its reflection thereby to determine pointer contact or pointer hover relative to said touch surface.

The present invention provides advantages in that pointer contacts with the touch surface can determined quickly and accurately by examining images that include the pointer and its reflection. When the pointer and its reflection meet in the captured image, pointer contact with the touch surface is deemed to have been made.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

The present invention relates to a touch system and method that allows pointer contacts with a touch surface to be determined. The touch system includes a touch surface and at least one imaging device acquiring images of the touch surface from an oblique angle. At least one processor communicates with the at least one imaging device and analyzes the acquired images to detect the relative positions of a pointer and a reflection of the pointer therein and thereby determine if a pointer contact with the touch surface has been made. Preferred embodiments of the present invention will now be described with reference to FIGS. 1 to 9.

Figure 1:
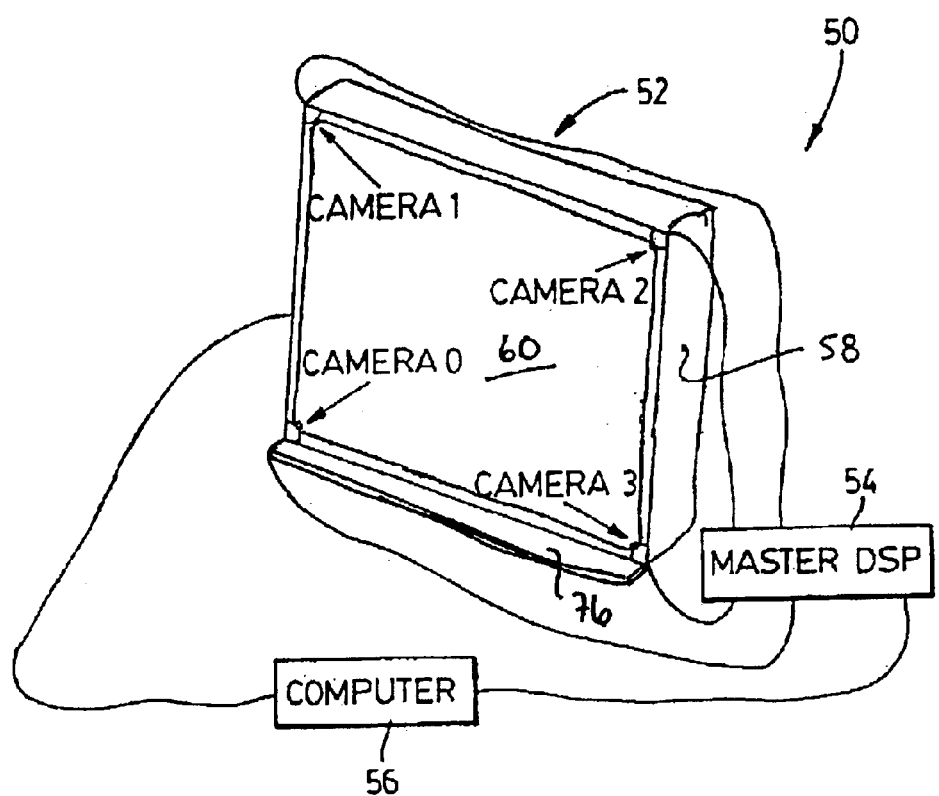
FIG. 1 is a schematic diagram of a camera-based touch system in accordance with the present invention.
Figure 2:
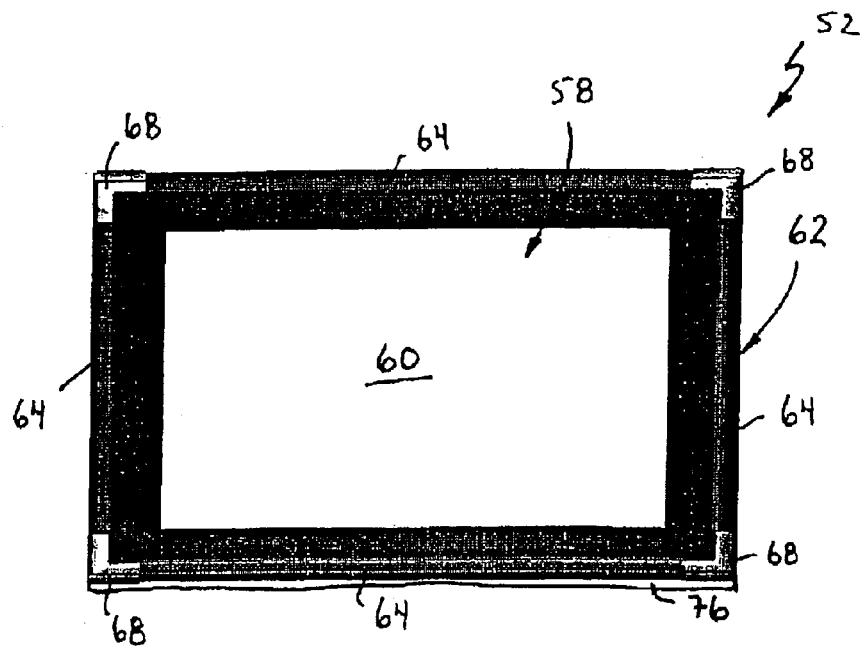
FIG. 2 is a front elevation view of a touch screen forming part of the touch system of FIG. 1.

Turning now to FIGS. 1 and 2, a camera-based touch system in accordance with the present invention is shown and is generally identified by reference numeral 50. Camera-based touch system 50 is similar to that disclosed in U.S. patent application No. (not available) for an invention entitled "Illuminated Bezel and Touch System Incorporating Same" filed on Jan. 30, 2003 assigned to SMART Technologies Inc., assignee of the present invention, the content of which is incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output that is presented on the touch screen 52. The touch screen 52, master controller 54 and computer 56 form a closed-loop so that pointer contacts with the touch screen 52 can be recorded as writing or drawing or used to control execution of an application program executed by the computer 56.

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 includes elongate side frame assembly 64 that are coupled to the sides of the plasma display 58. Each side frame assembly 64 accommodates a generally continuous illumination source 66. The ends of the side frame assembly 64 are joined by corner pieces 68 that house DSP-based CMOS digital cameras 70. Each digital camera is mounted within its respective corner piece 68 so that its field of view encompasses and looks obliquely across the entire touch surface 60 (i.e. at a generally flat angle relative to the touch surface).

A tool tray 76 is positioned adjacent the bottom edge of the touch surface 60 and accommodates a plurality of different color pointers in the form of pen tools used to contact the touch surface 60.

Figure 3:
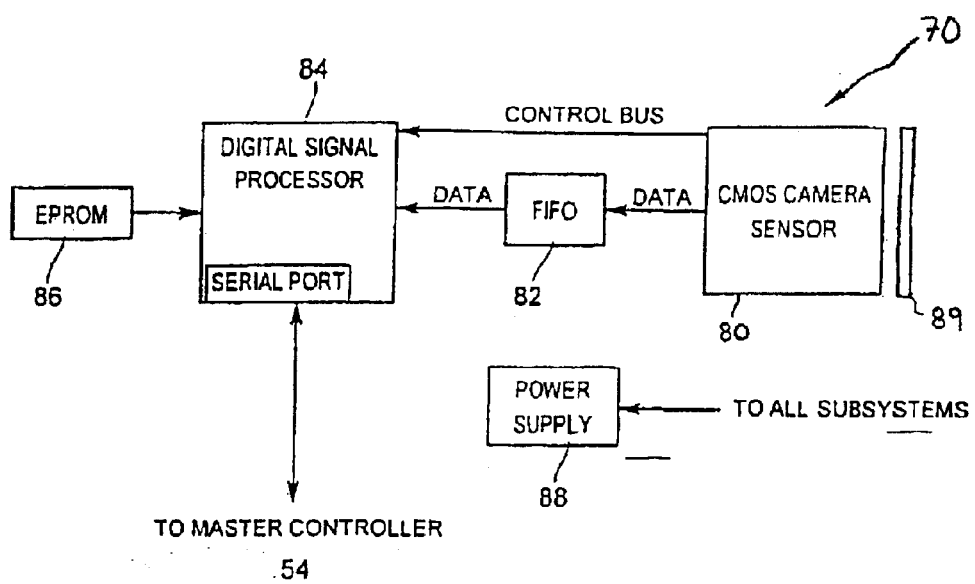
FIG. 3 is a schematic diagram of a digital camera forming part of the touch screen of FIG. 4.

One of the digital cameras within a corner piece 68 is shown in FIG. 3. As can be seen, each digital camera 70 includes a two-dimensional CMOS image sensor and associated lens assembly 80, a first-in-first-out (FIFO) buffer 82 coupled to the image sensor and lens assembly 80 by a data bus, and a digital signal processor (DSP) 84 coupled to the FIFO 82 by a data bus and to the image sensor and lens assembly 80 by a control bus (see FIG. 4). A boot EPROM 86 and a power supply subsystem 88 are also included. In the present embodiment, the CMOS camera image sensor is configured for a 20×648 pixel subarray that can be operated to capture image frames at rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as in lit rooms.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

An infrared pass filter 89 is provided on the digital camera image sensor and lens assembly 80 to blind the digital camera 70 to frequencies of light other than the light broadcasted by the illuminated bezel 62.

Figure 4:
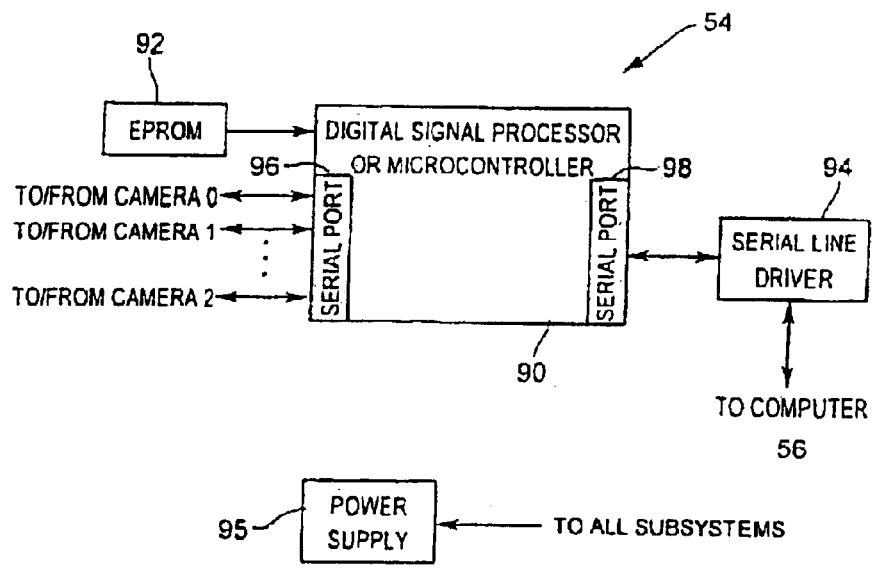
FIG. 4 is a schematic diagram of a master controller forming part of the touch system of FIG. 1.

Master controller 54 is best illustrated in FIG. 4 and includes a DSP 90, a boot EPROM 92, a serial line driver 94 and a power supply subsystem 95. The DSP 90 communicates with the DSPs 84 of the digital cameras 70 over a data bus via a serial port 96 and communicates with the computer 56 over a data bus via a serial port 98 and the serial line driver 94.

The master controller 54 and each digital camera 70 follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 70 in to the DSP 90 and the master controller 54 and the remaining two (2) channels are unused. The master controller 54 monitors the twenty-four (24) channels assigned to the DSPs 84 while the DSPs 84 monitor the six (6) channels assigned to the DSP 90 of the master controller 54. Communications between the master controller 54 and the digital camera 70 are performed as background processes in response to interrupts.

The operation of the touch system 50 will now be described. Each digital camera 70 acquires images looking along the touch surface 60 within the field of view of its image sensor and lens assembly 80 at a desired frame rate and process each acquired image to determine if a pointer is in the acquired image. During image capture, the illuminated bezel 62 provides adequate backlighting for the digital cameras 70. If a pointer is in the acquired image, the image is further processed to determine characteristics of the pointer contacting or hovering above the touch surface 60. Pointer information packets (PIPs) including pointer characteristics, status and/or diagnostic information are then generated by the digital camera 70 and the PIPs are queued for transmission to the master controller 54. The digital cameras 70 also receive and respond to command PIPs generated by the master controller 54.

The master controller 54 polls the digital cameras 70 for PIPs. If the PIPs include pointer characteristic information, the master controller 54 triangulates pointer characteristics in the PIPs to determine the position of the pointer relative to the touch surface 60 in Cartesian rectangular coordinates. The master controller 54 in turn transmits calculated pointer position data, status and/or diagnostic information to the computer 56. In this manner, the pointer position data transmitted to the computer 56 can be recorded as writing or drawing or can be used to control execution of an applications program executed by the computer 56. The computer also updates the computer-generated image output conveyed to the plasma display 58 so that the information presented on the touch surface 60 reflects the pointer activity.

The master controller 54 also receives commands from the computer 56 and responds accordingly as well as generates and conveys commands to the digital camera 70. Specifics concerning the processing of acquired images and the triangulation of pointer characteristics in PIPs are described in PCT Application No. WO 02/03316, assigned to SMART Technologies, Inc., assignee of the present invention, the content of which is incorporated herein by reference. Accordingly, specifics will not be described herein.

To determine if a pointer is contacting the touch surface 60 or hovering above the touch surface, each DSP 84 processes a pixel subset of the captured images to discern illuminated pixels from non-illuminated pixels thereby to detect the pointer and its reflection in the captured images. Non-illuminated pixels represent the pointer and its reflection since the pointer occludes backlighting projected by the illuminated bezel 62.

Figure 5:
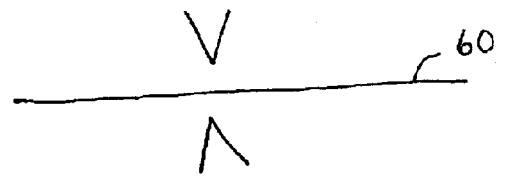
FIG. 5 is an illustration of a pointer approaching the touch surface of the touch screen and the reflection of the pointer.
Figure 6:
FIG. 6 is an illustration of a pointer in contact with the touch surface of the touch screen and the reflection of the pointer.

The horizontal rows of the pixel subset are then examined to determine if any illuminated horizontal pixel rows exist between pixels representing the pointer and its reflection. If so, a pointer hover above the touch surface 60 is determined as shown in FIG. 5. If the pixels representing the pointer and its reflection meet or touch (i.e. there are no illuminated horizontal pixel rows separating these pixels), a pointer contact with the touch surface 60 is deemed to have been made as shown in FIG. 6. In this embodiment since the digital cameras 70 are generally aligned with and look across the plane of the touch surface 60, examining the captured images to detect illuminated horizontal pixel rows allows pointer hover and pointer contact to be determined accurately. As will be appreciated if the digital cameras 70 are orientated differently, pointer hover can be determined by detecting illuminated pixels separating dark pixel clusters representing the pointer and its reflection.

When the master controller 54 receives a PIP from a DSP 84 that signifies pointer contact with the touch surface 60, the master controller 54 waits for PIPs from the remaining digital camera DSPs 84 before, notifying the computer 56 that a pointer contact on the touch surface 60 has been made.

Figure 7:
FIG. 7 is an image captured by a digital camera showing the illuminated bezel.
Figure 8:
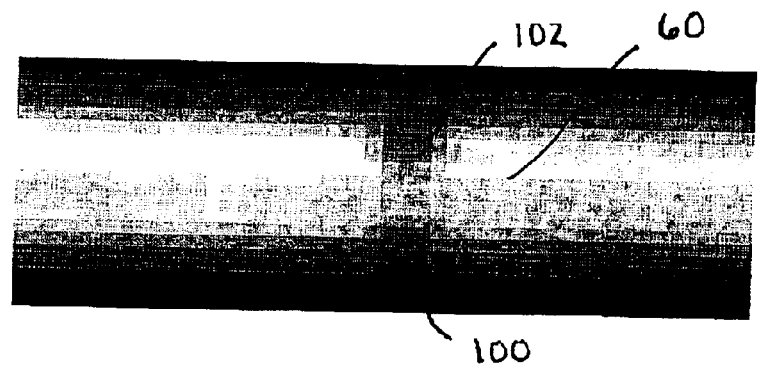
FIG. 8 is an image captured by a digital camera including a pointer approaching the touch surface.
Figure 9:
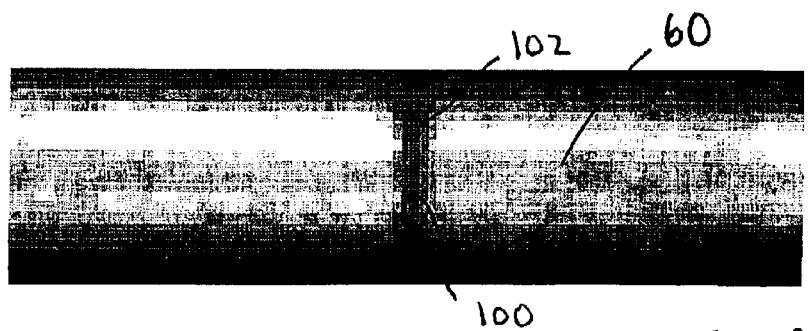
FIG. 9 is an image captured by a digital camera including a pointer in contact with the touch surface.

FIGS. 7 to 9 show images captured by a digital camera 70. In FIG. 7, an image taken across the touch surface 60 is shown. No pointer is in the captured image and the illuminated bezel 62 is clearly visible in the image. In FIG. 8, a pointer 100 and its reflection 102 are in the captured image. The pointer 100 and its reflection 102 are separated by illuminated pixel rows signifying a pointer hover condition. In FIG. 9, the pointer 100 and its reflection 102 meet signifying pointer contact with the touch surface 60.

As will be appreciated, in the preferred embodiment the present touch system and method allows pointer contact and pointer hover to be determined by examining images to detect non-target or empty pixels (i.e. pixels that do not represent the pointer and its reflection) separating pixels representing the pointer and its reflection. In the present embodiment, the non-target or empty pixels are illuminated. Those of skill in the art will however appreciate that the non-target or empty pixels may have other values so long as they can be distinguished from pixels representing the pointer and its reflection.

Rather than waiting for each digital camera 70 to generate a PIP that signifies a pointer contact with the touch surface 60, alternatives are available. For example, as the pointer is approaching the touch surface, the digital camera 70 that best sees the pointer and its reflection can be determined and the DSP output from that digital camera can be used to signify pointer contact with the touch surface 60. Typically, the digital camera 70 closest to the pointer will best see the pointer and its reflection. The pointer contact result generated by this digital camera will have the best precision due to the increase in image resolution as a result of its proximity to the pointer.

Alternatively, the pointer contact results generated by the DSPs 84 can be weighted based on the expectancies of the digital cameras 70 in providing accurate pointer contact detection.

Although preferred embodiments of the present invention have been described, those of skill in the art will appreciate that variations and modifications may be made without departing from the spirit and scope thereof as defined by the appended claims.

What is claimed is:

1. A method of determining pointer contact with a touch surface comprising the steps of:

capturing an image using an imaging device having a field of view oriented obliquely with respect to said touch surface; and processing the captured image to detect a pointer and a reflection of the pointer therein and determine if the detected pointer and reflection meet signifying pointer contact with said touch surface.

2. The method of claim 1 wherein during said processing, pixels in said captured image are examined to determine if empty pixels separating the detected pointer and said reflection exist signifying non-pointer contact with said touch surface.

3. The method of claim 2 wherein during said processing, rows of said pixels are examined to determine if empty pixel rows separating the detected pointer and said reflection exist signifying non-pointer contact with said touch surface.

4. The method of claim 3 wherein said imaging device has a field of view looking across said touch surface and wherein said rows of pixels are horizontal.

5. The method of claim 2 further including the step of providing backlighting for said imaging device during image capture, said pointer and reflection being represented by non-illuminated pixels in said captured image, empty pixels being illuminated.

6. The method of claim 1 wherein during said processing a pixel subset of said captured image is processed.

7. The method of claim 6 wherein during said processing, pixels in said pixel subset are examined to determine if empty pixels separating the detected pointer and said reflection exist signifying non-pointer contact with said touch surface.

8. The method of claim 7 wherein during said processing, rows of said pixels are examined to determine if empty pixel rows separating the detected pointer and said reflection exist signifying non-pointer contact with said touch surface.

9. The method of claim 8 wherein said imaging device has a field of view looking across said touch surface and wherein said rows of pixels are horizontal.

10. The method of claim 7 further including the step of providing backlighting for said imaging device during image capture, said pointer and reflection being represented by non-illuminated pixels in said pixel subset, empty pixels being illuminated.

11. The method of claim 10 wherein said imaging device has a field of view looking across said touch surface and wherein said rows of pixels are horizontal.

12. A method of determining pointer contact with a touch surface comprising the steps of:

capturing images looking across said touch surface using a plurality of imaging devices positioned at different locations relative to said touch surface that have overlapping fields of view; and processing the captured images to detect a pointer and a reflection of the pointer therein and to determine the relative positions of said detected pointer and reflection and thereby determine pointer contact with said touch surface and pointer hover.

13. The method of claim 12 wherein during said processing, pixels in said captured images are examined to determine if empty pixels exist between a detected pointer and reflection signifying pointer hover.

14. The method of claim 13 wherein during said processing, rows of pixels in said captured images are examined.

15. The method of claim 13 wherein pointer contact is determined when images captured by each of said imaging devices signify pointer contact with said touch surface.

16. The method of claim 13 wherein pointer contact is determined when images captured by one of said imaging devices signifies pointer contact with said touch surface.

17. The method of claim 16 wherein said one imaging device is the imaging device closest to said pointer that captures images including said pointer and reflection.

18. The method of claim 14 wherein said imaging devices have fields of view looking across said touch surface and wherein said rows of pixels are horizontal.

19. The method of claim 13 further including the step of providing backlighting for said imaging devices during image capture, said pointer and reflection being represented by non-illuminated pixels in said captured images, empty pixels being illuminated.

20. A touch system comprising:

a touch surface to be contacted by a pointer;

at least one imaging device having a field of view looking generally across said touch surface; and at least one processor communicating with said at least one imaging device and analyzing images acquired by said at least one imaging device to detect the relative positions of a pointer and a reflection of the pointer therein and thereby determine if a pointer contact with the touch surface has been made.

21. A touch system according to claim 20 wherein said at least one processor analyzes the acquired images to detect a gap between the pointer and its reflection signifying pointer hover relative to said touch surface.

22. A touch system according to claim 21 further including a source of backlighting for said at least one imaging device, said gap between constituted by illuminated pixels separating non-illuminated pixels representing said pointer and reflection.

23. A camera-based touch system comprising:

at least one pair of cameras positioned at spaced locations and having overlapping fields of view encompassing a touch surface on which pointer contacts are made, said cameras looking obliquely across said touch surface and acquiring images; and a processor receiving and processing image data generated by the cameras to determine the location of a pointer relative to the area when the pointer is captured in images acquired by the cameras and analyzing the image data to detect the relative positions of the pointer and its reflection thereby to determine pointer contact or pointer hover relative to said touch surface.

24. A touch system according to claim 23 wherein said at least one processor analyzes the acquired images to detect a gap between the pointer and its reflection signifying pointer hover relative to said touch surface.

25. A touch system according to claim 24 further including a source of backlighting for said at least one imaging device, said gap between constituted by illuminated pixels separating non-illuminated pixels representing said pointer and reflection.

* * * * *